United States Patent
Shu et al.

(10) Patent No.: US 7,992,388 B2
(45) Date of Patent: Aug. 9, 2011

(54) METHOD FOR ESTIMATING COMPRESSOR OUTPUT TEMPERATURE FOR A TWO-STAGE TURBOCHARGER

(75) Inventors: Yong Shu, Northville, MI (US); Michiel J. Van Nieuwstadt, Ann Arbor, MI (US); Diana D. Brehob, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 482 days.

(21) Appl. No.: 11/856,733

(22) Filed: Sep. 18, 2007

(65) Prior Publication Data
US 2009/0071148 A1    Mar. 19, 2009

(51) Int. Cl.
*F02B 33/44* (2006.01)
*F02B 33/00* (2006.01)

(52) U.S. Cl. .......................... 60/605.1; 60/612; 123/562

(58) Field of Classification Search ............... 60/605.1, 60/612; 123/562
See application file for complete search history.

(56) References Cited

U.S. PATENT DOCUMENTS

| | | | | |
|---|---|---|---|---|
| 5,142,866 A * | 9/1992 | Yanagihara et al. | ............ | 60/612 |
| 6,112,523 A * | 9/2000 | Kamo et al. | ............ | 60/612 |
| 6,338,250 B1 | 1/2002 | Mackay | ............ | 60/612 |
| 6,401,457 B1 | 6/2002 | Wang et al. | ............ | 60/605.1 |
| 6,622,710 B2 * | 9/2003 | Hasegawa et al. | ............ | 123/563 |
| 6,698,203 B2 * | 3/2004 | Wang | ............ | 60/605.1 |
| 6,715,287 B1 | 4/2004 | Engel et al. | ............ | 60/601 |
| 7,104,120 B2 * | 9/2006 | Gladden | ............ | 73/114.77 |
| 7,143,580 B2 | 12/2006 | Ge | ............ | 60/605.1 |
| 7,260,933 B2 * | 8/2007 | Barba et al. | ............ | 60/605.1 |
| 7,296,562 B2 * | 11/2007 | Withrow et al. | ............ | 123/559.1 |
| 7,461,508 B2 * | 12/2008 | Rosin et al. | ............ | 60/612 |
| 7,805,939 B2 * | 10/2010 | Kimoto et al. | ............ | 60/612 |
| 7,827,790 B2 * | 11/2010 | Kimoto et al. | ............ | 60/607 |

FOREIGN PATENT DOCUMENTS

JP    2001280142 A   * 10/2001

* cited by examiner

*Primary Examiner* — Thai Ba Trieu (57) ABSTRACT

A method for estimating the output temperature of the output compressor of a two-stage turbocharger. The method includes: storing a composite relationship relating temperature ratio across a pair of compressors of the two-stage turbocharger as a function of mass flow through such pair of compressors and pressure drop across the pair of the compressors; calculating the pressure ratio equal to the pressure at an input to the first one of the pair of compressors to the pressure at the output of the second one of the pair compressor; using the composite relationship and an output of a mass flow at the input to the first one of the pair of compressors and the calculated pressure ratio to determine the temperature ratio across the pair of compressors; and calculating the estimated output temperature of the second one of the pair of compressors by multiplying the determined temperature ratio across the pair of compressors by a temperature at the input of the first one of the pair of compressors.

14 Claims, 7 Drawing Sheets

METHOD FOR ESTIMATING COMPRESSOR OUTPUT TEMPERATURE FOR A TWO-STAGE TURBOCHARGER

TECHNICAL FIELD

This invention relates generally to two-stage turbochargers and more particularly to methods for estimating compressor output temperature for a two-stage turbocharger.

BACKGROUND

As is known in the art, the compressor outlet temperature of a turbocharger cannot exceed the capability of the material of the compressor outlet housing under all of turbocharged engine operating conditions; not only for the turbocharged engine at sea level conditions, but also when the turbocharger is operating at altitude to ensure adequate operating margins. If any of the mechanical or thermal loading limits are exceeded, boost pressure or fueling is decreased and recalculate the new turbocharger operating points are recalculated to find satisfactory conditions. The conventional method to calculate the compressor outlet temperature uses compressor efficiency to obtain relatively accurate results. However, this method cannot be extended to a two-stage turbo charger because the efficiency map of a two-stage compressor cannot be derived directly and further it is relatively difficult to maintain adequate accuracy without extensive experiments.

As is known, using the thermal second law analysis, for a compressor, assuming that the compression process is isentropic, the following relation between the temperature and pressure at the inlet ($T_{c\_in}$, $p_{c\_in}$) and at the outlet ($T_{c,is}$, $p_{c\_out}$) the compressor can be derived:

$$\left(\frac{T_{c,is}}{T_{c\_in}}\right) = \left(\frac{p_{c\_out}}{p_{c\_in}}\right)^{\frac{\gamma-1}{\gamma}} \quad (1)$$

However, due to enthalpy losses across the compressor the compression process is not isentropic in reality. Therefore, the compressor isentropic efficiency, $\eta_c$, is introduced which relates the theoretical temperature rise (leading to $T_{c,is}$) to the actual (resulting in $T_{c\_out}$) where:

$$\eta_c = \frac{T_{c,is} - T_{c\_in}}{T_{c\_out} - T_{c\_in}} \quad (2)$$

Substituting this into (1) yields the expression:

$$\eta_c = \frac{\left(\frac{p_{c\_out}}{p_{c\_in}}\right)^{\frac{\gamma-1}{\gamma}} - 1}{\frac{T_{c\_out}}{T_{c\_in}} - 1} \quad (3)$$

where $\gamma$ is the specific heat ratio. Then the temperature downstream of the compressor from (3):

$$\Pi_T = \frac{T_{c\_out}}{T_{c\_in}} = 1 + \frac{1}{\eta_c}\left(\Pi_p^{\frac{\gamma-1}{\gamma}} - 1\right) \quad (4)$$

where $$\Pi_p = \frac{P_{c\_out}}{P_{c\_in}};$$

$$\Pi_T = \frac{T_{c\_out}}{T_{c\_in}}.$$

Figure 1:
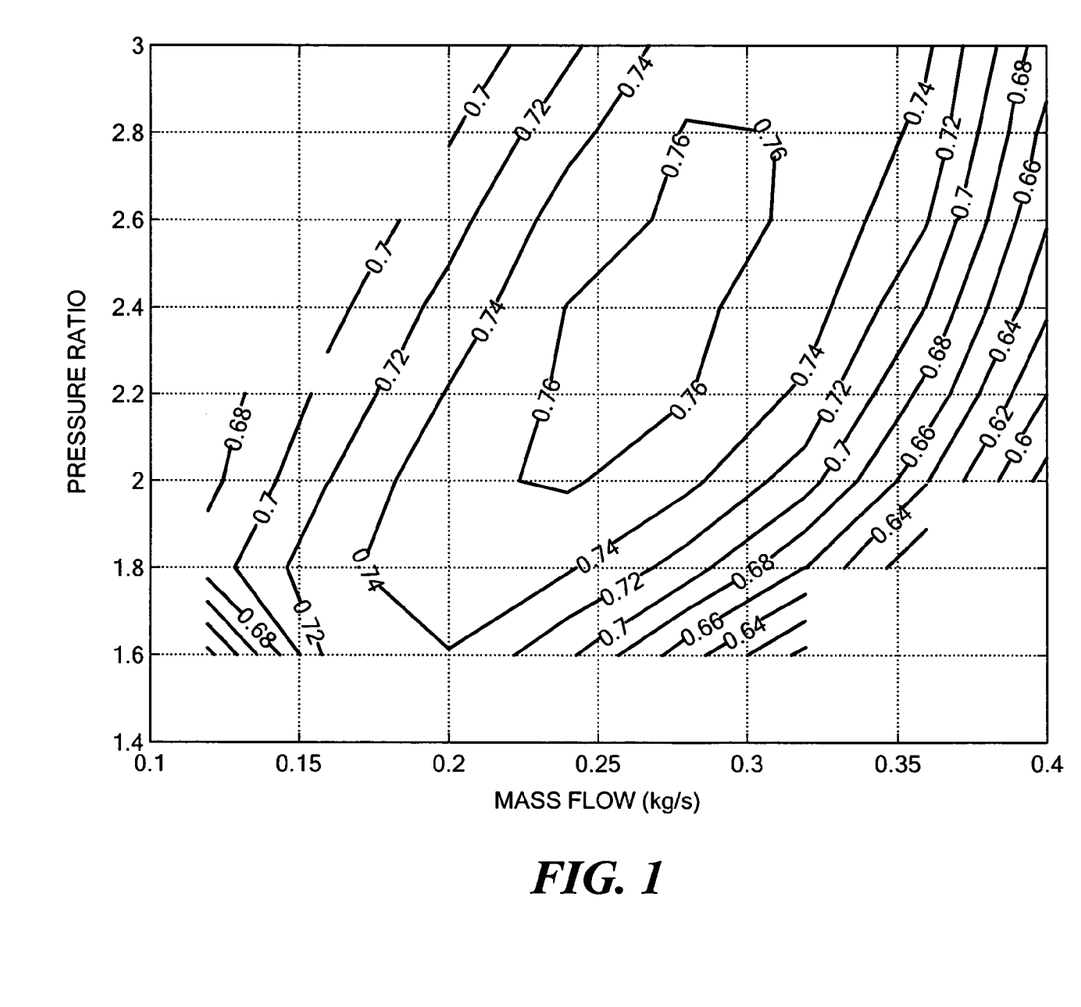
FIG. 1 is a map of lines of constant efficiency of a compressor used in a turbocharger as a function of air mass flow through the compressor and pressure ratio across the compressor.

The compressor efficiency, $\eta_c$, is the ratio of isentropic rise to the actual temperature rise across the compressor, and is used to compensate for the losses caused by other physical effects which are difficult to model. Since the compressor efficiency, $\eta_c$, varies little along the steady state operating point, it is typically modeled with a map, called the compressor efficiency map of lines of constant efficiency, $\eta_c$, shown in FIG. 1, which is a function of the pressure ratio, $\Pi_p$, of compressor and reduced air mass flow. Thus, for a measured mass airflow and a ratio $\Pi_p$ of measured output pressure to measured input pressure, the compressor efficiency, $\eta_c$, can be determined from the map in FIG. 1. Having the compressor efficiency, $\eta_c$, from the map and a measured input temperature, $T_{c\_in}$, the output temperature, $T_{c\_out}$, can be calculated from equation (4). However, with the "island-like" efficiency lines, as shown in FIG. 1, it would require significant effort to extend the range of available experimental data on a flow bench or engine cell, rather than trying to predict or extrapolate the behavior outside of the given range, even some points inside of the given range. Further, applying this process to a second, cascaded compressor (i.e., a two-stage turbocharger) would require additional temperature and pressure sensors.

SUMMARY

In accordance with the disclosure, a method for estimating output temperature of the output compressor of a two-stage turbocharger is provided. The method includes: storing a composite relationship relating temperature ratio across a pair of compressors of the two-stage turbocharger as a function of mass flow through such pair of compressors and pressure drop across the pair of the compressors; calculating the pressure ratio equal to the pressure at an input to the first one of the pair of compressors to pressure at the output of the second one of the pair compressor; using the combined relationship and an output of a mass flow at the input to the first one of the pair of compressors and the calculated pressure ratio to determine the temperature ratio across the pair of compressors; and calculating the estimated output temperature of the second one of the pair of compressors by multiplying the determined temperature ratio across the pair of compressors by temperature at the input of the first one of the pair of compressors.

In one embodiment, the method includes: obtaining a first relationship relating temperature ratio across a first one of a pair of compressors of the two-stage turbocharger as a function of mass flow through such first one of the compressors and pressure drop across the first one of the compressors; obtaining a second relationship relating temperature ratio across a second one of a pair of compressors of the two-stage turbocharger as a function of mass flow through such second one of the compressors and pressure drop across the second one of the compressors; and combining the first relationship and the second relationship into a composite relationship, such composite relationship relating temperature ratio across the pair of compressors of the two-stage turbocharger as a function of mass flow through such pair of compressors and pressure drop across the pair of the compressors.

In accordance with one embodiment of the invention, a method is provided for estimating output compressor output temperature for a two-stage turbocharger. The method includes: obtaining a first relationship relating temperature ratio, $\Pi_{T\_Low\_Stage}$, across a first one of a pair of compressors of the two-stage turbocharger as a function of mass flow through such first one of the compressors and pressure drop, $\Pi_{P\_Low\_Stage}$, across the first one of the compressors; obtaining a second relationship relating temperature ratio, $\Pi_{T\_High\_Stage}$, across a second one of a pair of compressors of the two-stage turbocharger as a function of mass flow through such second one of the compressors and pressure drop, $\Pi_{P\_High\_Stage}$, across the second one of the compressors; and combining the first relationship and the second relationship into a composite relationship, such composite relationship relating temperature ratio, $\Pi_{T\_TWO} = \Pi_{T\_Low\_Stage} \times \Pi_{T\_High\_Stage}$, across the pair of compressors of the two-stage turbocharger as a function of mass flow through such pair of compressors and pressure drop, $\Pi_{P\_TWO} = \Pi_{P\_Low\_Stage} \times \Pi_{P\_High\_Stage}$, across the pair of the compressors.

With such methods, an accurate determination of compressor outlet temperature for a two stage compressor is obtained without adding any inter-stage sensor, thereby eliminating the need for any additional sensors to protect the compressor outlet from too high temperatures. Further, the method models the compressor with much flatter curves, yielding much better extrapolatibility. Further, only a few experimentally measured data points may suffice to characterize a large operating region and extensive experimental development time can thus be reduced. Consequently, the temperature ratio across the compressor becomes a function of the pressure ratio across the compressor and reduced mass airflow. The compressor isentropic efficiencies are not used in this model.

In one embodiment, an internal combustion engine system is provided having: a two-stage turbocharger; and an engine control unit. The engine control unit includes a composite relationship stored therein, such composite relationship relating temperature ratio across a pair of compressors of the two-stage turbocharger as a function of mass flow through such pair of compressors and pressure drop across the pair of the compressors; and a processor for calculating the pressure ratio equal to the pressure at an input to the first one of the pair of compressors to the pressure at the output of the second one of the pair compressor; using the composite relationship and an output of a mass flow at the input to the first one of the pair of compressors and the calculated pressure ratio to determine the temperature ratio across the pair of compressors; and calculating the estimated output temperature of the second one of the pair of compressors by multiplying the determined temperature ratio across the pair of compressors by a temperature at the input of the first one of the pair of compressors.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 2:
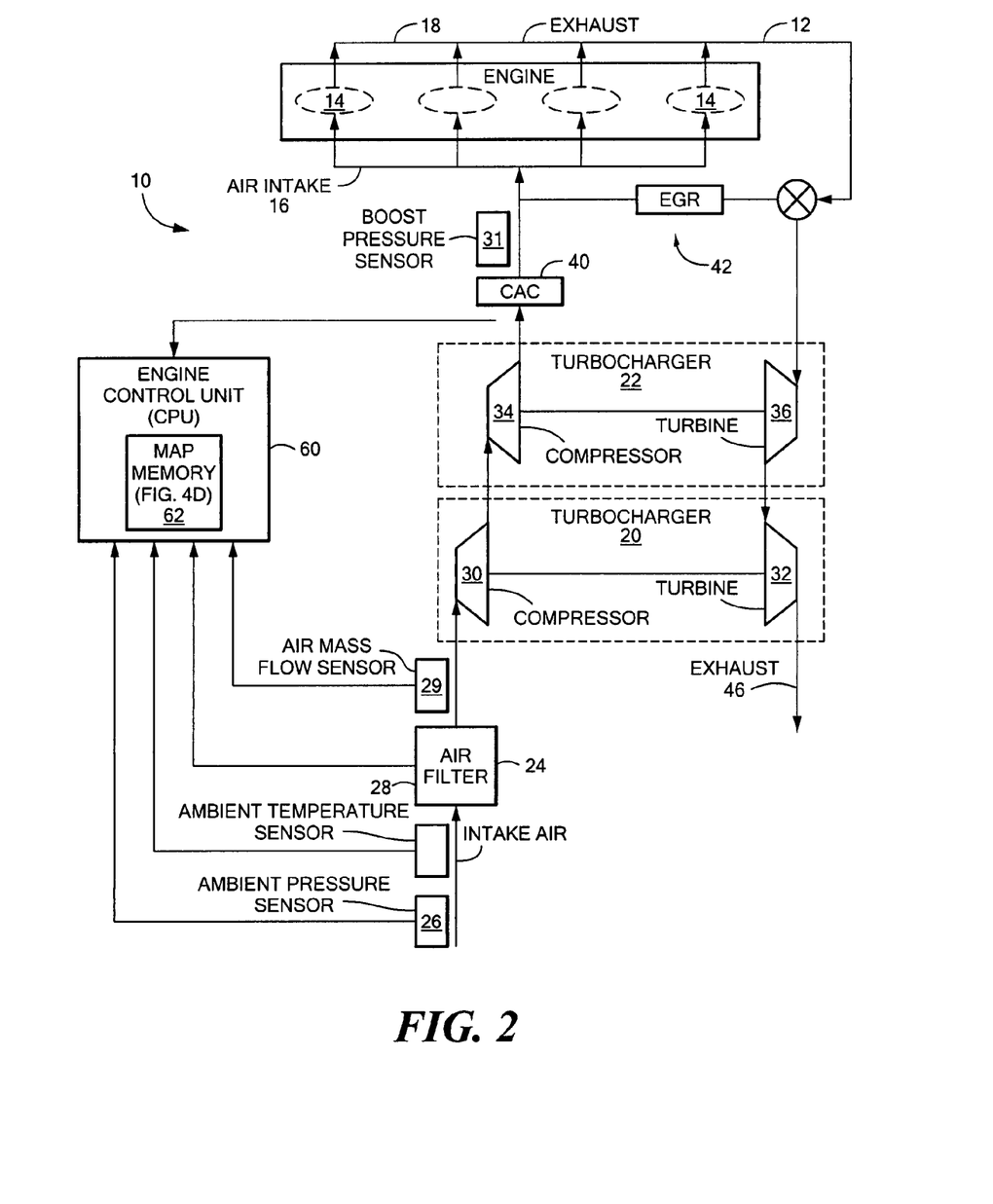
FIG. 2 is a simplified block diagram of an engine system two-stage turbocharger and using a method for estimating output temperature of a compressor used in such system.

Referring now to FIG. 2, a two-stage turbocharged engine system 10 is shown. The system includes an internal combustion engine 12 having, here for example, four cylinders 14, an intake manifold 16 and an exhaust manifold 18 all arranged in a conventional manner as shown.

The system 10 includes a pair of cascaded turbochargers 20, 22; i.e., a low-stage turbocharger 20 and a high-stage turbocharger 22. The low-stage turbocharger 20 includes a compressor 30 mechanically connected to a turbine 32 and the high-stage turbocharger 22 includes a compressor 34 mechanically connected to a turbine 36 as shown.

Outside air is fed to the low stage, turbocharger 20, and more particularly to the compressor 30 through an air filter 24, an ambient pressure sensor 26 used to measure ambient pressure, here also the pressure $P_{c\_in}$ into the compressor 30, an ambient temperature sensor 28 used to measure ambient temperature, here also the temperature $T_{c\_in}$ of the air onto the compressor 30, and a mass flow sensor 28 used to measure the mass flow into the compressor 30. It should be noted that more typically the pressure drop across the air intake system is modeled from P_ambient and mass flow and the temperature drop across the air intake system is modeled from T_ambient and mass flow.

The air out of the compressor 30 is fed to the compressor 34, as shown. A boost pressure sensor 31 disposed downstream of the CAC (i.e., cooler) is used to determine the pressure, $P_{c\_out}$, of the air at the output of the compressor 34. It is noted that here the pressure downstream of compressor 34 is modeled from boost pressure and pressure losses over the CAC and pipes connecting it.

The air out of the compressor 34 is fed to the intake 16 through a CAC (i.e., cooler) 40 in a conventional manner. The system 10 includes a conventional EGR system 42 with a portion of the exhaust gas from the engine 12 being passed to turbine 36 and then to turbine 32, and then, via exhaust line 46, to an exhaust treatment device, not shown.

The system 10 also includes an engine control unit 60, here including a central processing unit (CPU) and a memory 62 storing a relationship, here in the form of a map shown in FIG. 2D. The generation of data stored in the memory 62 will be described in more detail hereinafter and in connection with FIG. 3. Suffice it to say here that the data stored in the memory 62 is used for estimating output compressor output temperature for the two-stage turbocharger.

Figure 4A:
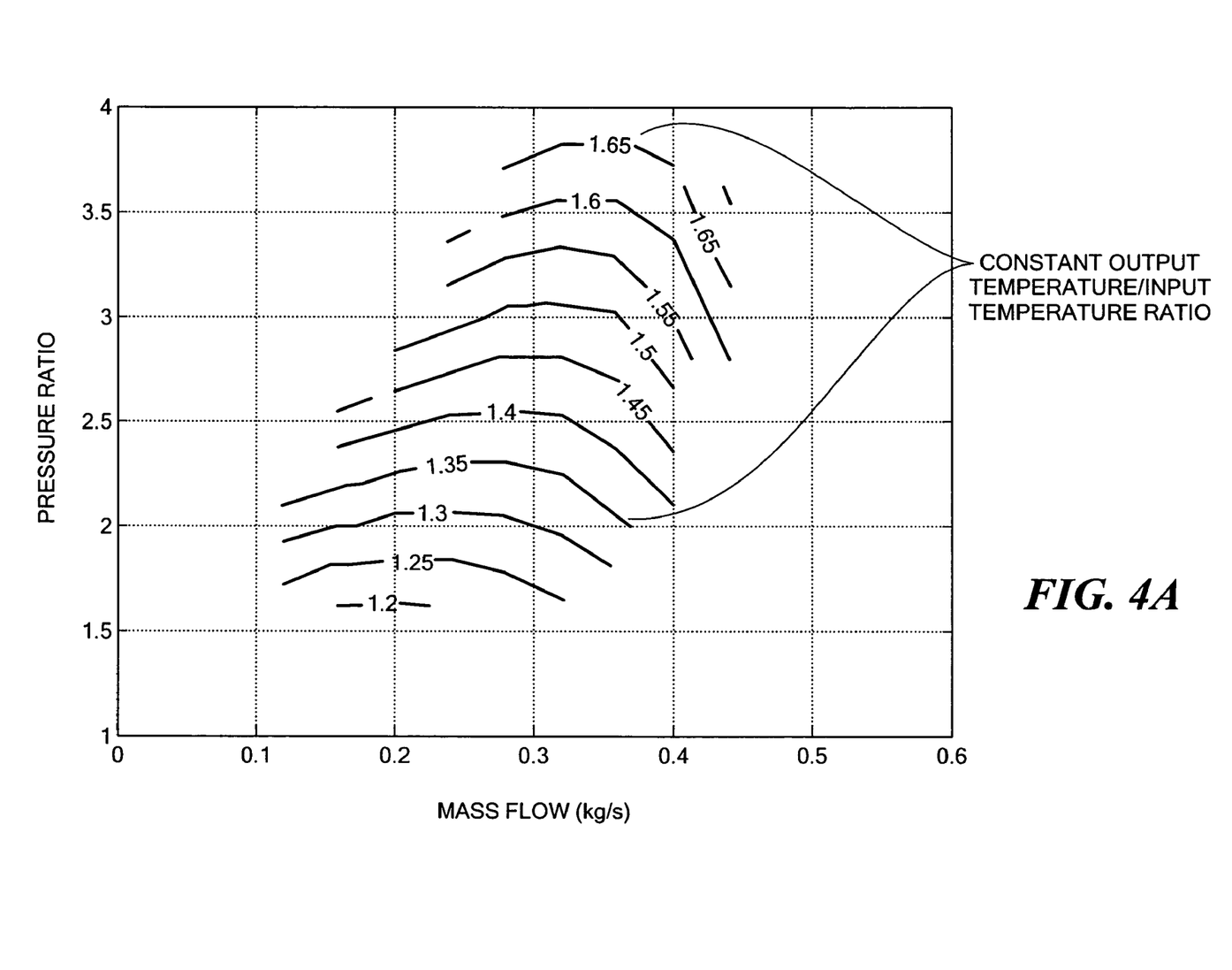
FIG. 4A is an exemplary temperature ratio map of a low stage one of a pair of compressors used in the system of FIG. 2.
Figure 4B:
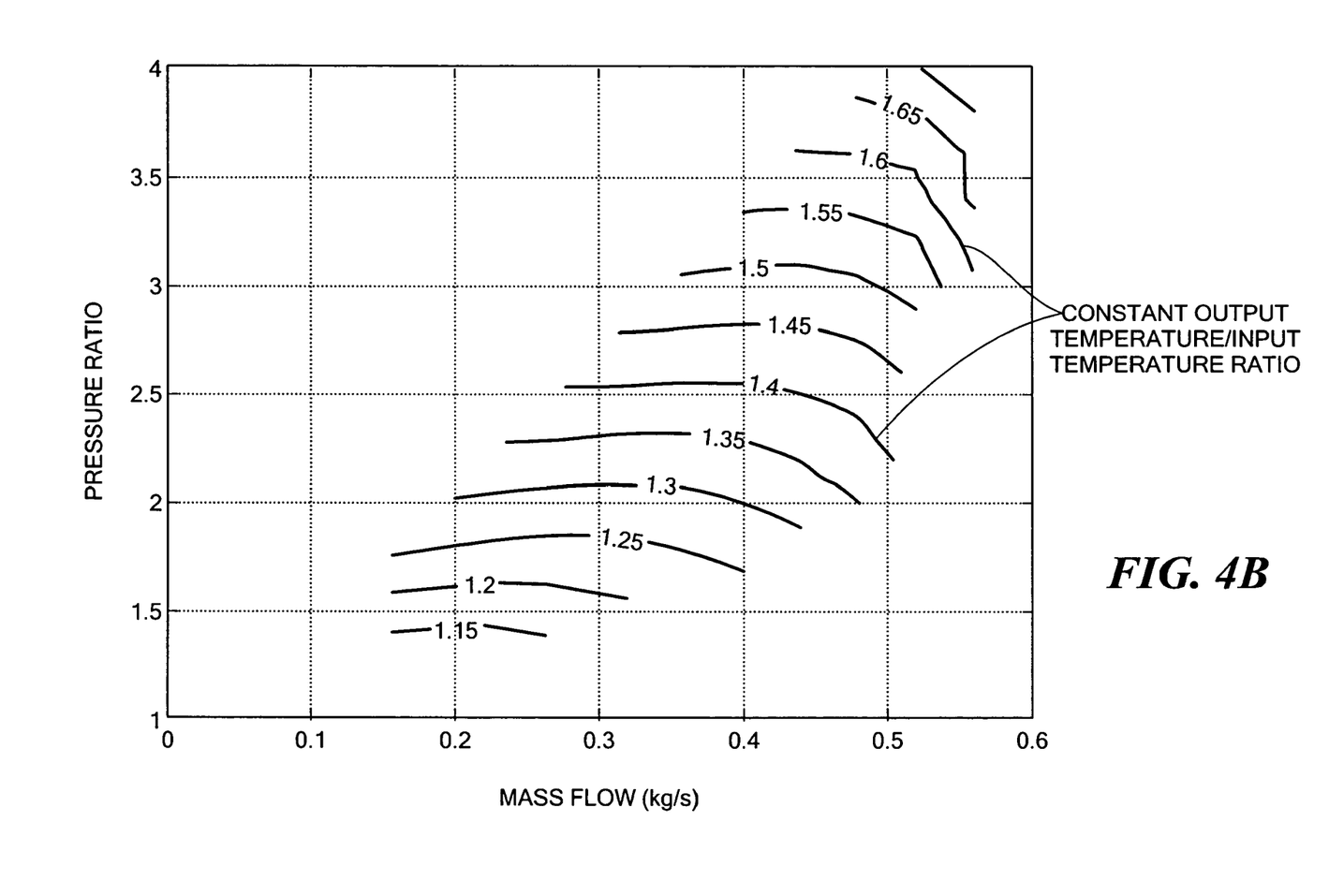
FIG. 4B is an exemplary temperature ratio map of a high stage one of a pair of compressors used in the system of FIG. 2.

As will be described in more detail below, the temperature ratio across the cascaded compressors 30, 34 is a function of the pressure ratio across the compressors 30, 34 and reduced mass air flow measured by sensor 29 (It is noted that reduced mass flow means it is made non-dimensional by multiplication with p/sqrt(T)). For the two-stage compressor, the total temperature ratio and total pressure ratio across the two-stage compressor (i.e. across the cascaded compressors 30, 34) can be described as:

$$\Pi_{T\_TWO} = \Pi_{T\_Low\_Stage} \times \Pi_{T\_High\_Stage} \quad (5)$$

$$\Pi_{P\_TWO} = \Pi_{P\_Low\_Stage} \times \Pi_{P\_High\_Stage} \quad (6)$$

where $\Pi_{T\_Low\_Stage}$ is the temperature ratio of the temperatures across compressor 30 determined from FIG. 4A as a function of mass flow and differential pressure across compressor 30;

$\Pi_{T\_High\_Stage}$ is the temperature ratio of the temperatures across compressor 34 determined from FIG. 4A as a function of mass flow and differential pressure across compressor 30;

$\Pi_{P\_Low\_Stage}$ is the pressure ratio of the pressures across compressor 30 determined from FIG. 4B as a function of mass flow and differential pressure across compressor 30; and $\Pi_{P\_High\_Stage}$ is the pressure ratio of the pressures across compressor 34 determined from FIG. 4B as a function of mass flow and differential pressure across compressor 34.

An exemplary low-stage temperature ratio relationship, here for example in the form of a map obtained typically from the manufacturer of compressor 30 is shown in FIG. 4A. An exemplary high-stage temperature ratio map obtained typically from the manufacturer of compressor 34 is shown in FIG. 4B. Using the equations (5) and (6), the data in FIG. 4A and FIG. 4B can be converted to the map of data shown in FIG. 4C which is represented the combine two-stage temperature ratio map.

Figure 3:
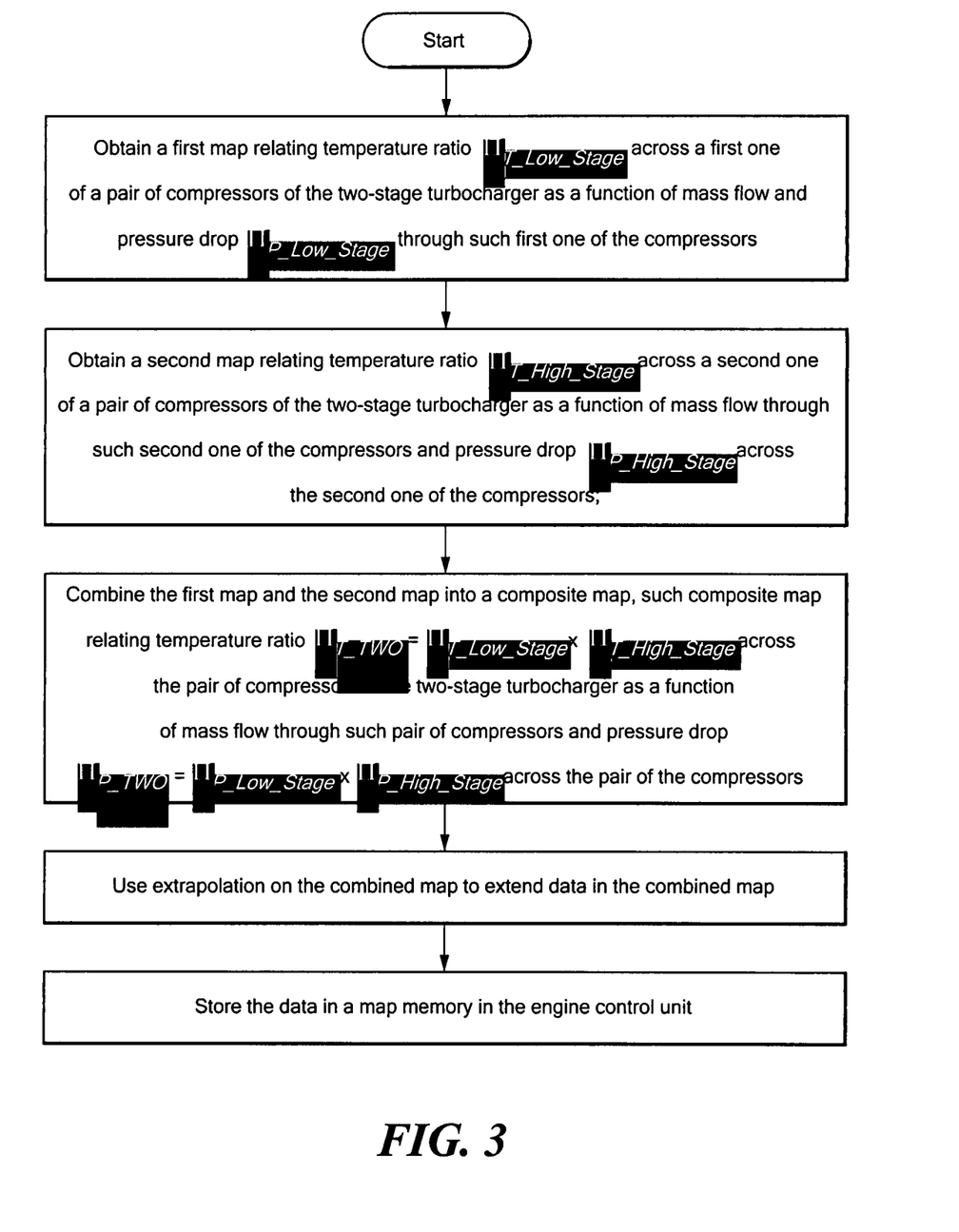
FIG. 3 is a flow diagram of the process used by the system of FIG. 2 to estimate the output temperature of a compressor used in such system.

Thus, referring to FIG. 3 the method of generating the relationship, here for example on the form of a map stored in memory 62 includes: obtaining a first relationship, here for example, in the form of a map relating temperature ratio $\Pi_{T\_Low\_Stage}$ across a first one of a pair of compressors (here compressor 30) of the two-stage turbocharger as a function of mass flow through such first one of the compressors and pressure drop $\Pi_{P\_Low\_Stage}$ across the first one of the compressors; obtaining a second relationship, here for example in the form of a map relating temperature ratio $\Pi_{T\_High\_Stage}$ across a second one of a pair of compressors (here compressor 34) of the two-stage turbocharger as a function of mass flow through such second one of the compressors and pressure drop $\Pi_{P\_High\_Stage}$ across the second one of the compressors; and then combining the first relationship (e.g. map) and the second relationship (e.g., map) into a composite relationship (e.g., map), such composite map relating temperature ratio $\Pi_{T\_TWO} = \Pi_{T\_Low\_Stage} \times \Pi_{T\_High\_Stage}$ across the pair of compressors of the two-stage turbocharger as a function of mass flow through such pair of compressors and pressure drop $\Pi_{P\_TWO} = \Pi_{P\_Low\_Stage} \times \Pi_{P\_High\_Stage}$ across the pair of the compressors. Next, a more complete map is generated using extrapolation the combined map to extend data in the combined map. Next, the store the more complete map is stored in a map memory 62 in the engine control unit 60.

Figure 4C:
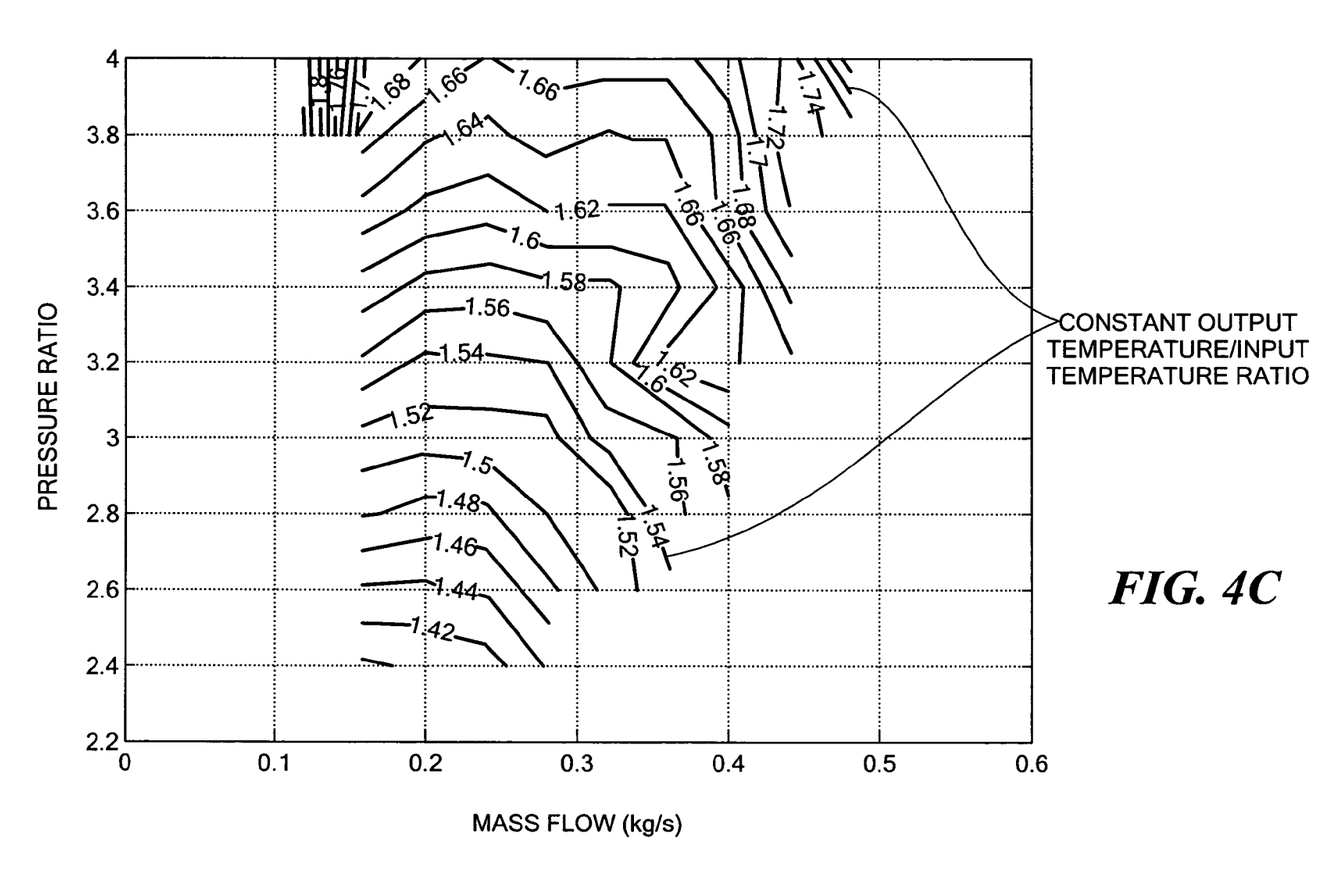
FIG. 4C is an exemplary two-stage temperature ratio map generated by combining the map of FIG. 4A with the map of FIG. 4B in accordance with the invention.
Figure 4D:
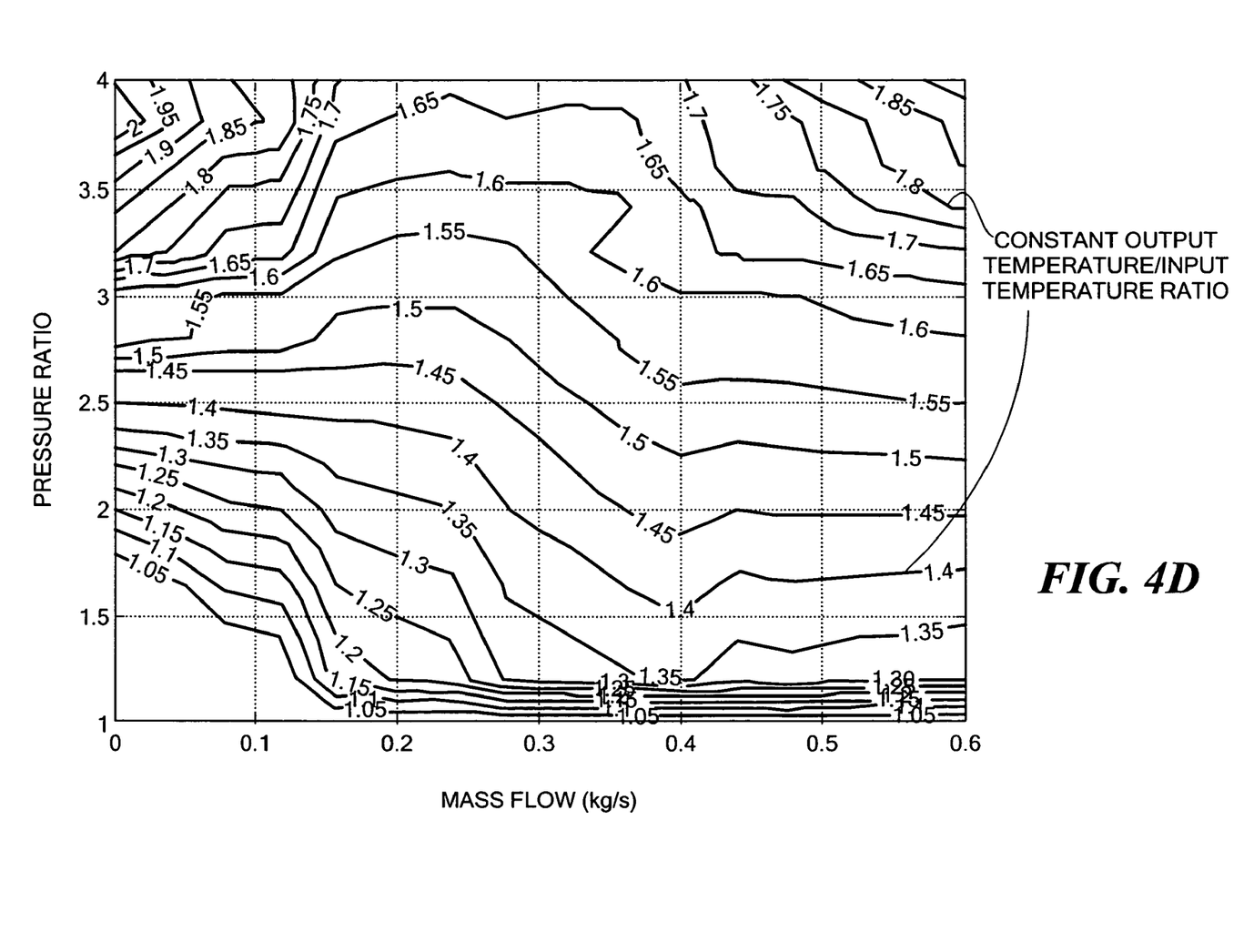
FIG. 4D is a map generated by using extrapolation on the data points in the map of FIG. 4C to generate additional data points in such map.

For example, generation of one exemplary data point in the map of data in FIG. 4C is as follows: Consider that the mass flow to compressor 30 is 2 kg/s and the pressure ratio, $\Pi_{P\_Low\_Stage}$, across compressor 30 is 1.75. Thus, from FIG. 4A for such example, the temperature ratio $\Pi_{T\_Low\_Stage}$ across compressor 30 is, from FIG. 4A, about 1.255. Consider that the mass flow to compressor 34 is 2 kg/s and the pressure ratio $\Pi_{P\_High\_Stage}$ across compressor 34 is 1.75. From FIG. 4B, the temperature ratio $\Pi_{T\_High\_Stage}$ across compressor 34 is about 1.571. Thus, in this example, $\Pi_{T\_TWO}$=1.225× 1.251=1.532. Thus, since $\Pi_{P\_TWO} = \Pi_{P\_Low\_Stage} \times \Pi_{P\_High\_Stage}$ in this example is 1.75×1.75=3.06, the data point for a composite temperature ratio $\Pi_{T\_TWO}$ of, in this example, 1.532 is established for a total pressure ratio $\Pi_{P\_TWO}$ across the cascaded compressors 30, 34 of 3.06 and for a mass flow of 2 kg/s. This process is used to generate the other data shown in FIG. 4D. Thus, the temperature at the output of compressor 34 can be estimated by the engine control unit 60 first calculating the ratio of the output of pressure sensor 26 by the output of pressure sensor 31 to produce $\Pi_{P\_TWO}$, then using the calculated $\Pi_{P\_TWO}$, and the mass flow sensor 29, looking up $\Pi_{T\_TWO}$ in the map stored in the engine control unit 60 (i.e., the map shown in FIG. 4C or preferably the extrapolated data map in FIG. 4D), and finally calculating the estimated output temperature of the compressor 34 by multiplying $\Pi_{T\_TWO}$ by the temperature sensed by temperature sensor 28.

A number of embodiments of the invention have been described. Nevertheless, it will be understood that various modifications may be made without departing from the spirit and scope of the invention. For example, it should be understood that the temperature upstream of the compressor 30 could be modeled from measured ambient temperature and temperature losses over the intake system. Still further, the pressure upstream compressor 30 can be modeled from measured ambient pressure and modeled pressure losses over the intake system. Still further, it should be understood that the map might take the form of a look up table or a polynomial or other functional curve, neural network, fuzzy logic or Chebyshev function approximation, for example. Temperature upstream LP compressor 30 can be modeled from measured ambient temperature and temperature losses over the intake system. Pressure downstream HP compressor 34 can be modeled from boost pressure and pressure losses over the CAC and pipes connecting it. Pressure upstream LP compressor 30 can be modeled from measured ambient pressure and modeled pressure losses over the intake system. Accordingly, other embodiments are within the scope of the following claims.

What is claimed is:

1. A method of estimating output temperature of an output of a pair of serially coupled compressors of a two-stage turbocharger system, said two-stage turbocharger system including: a mass flow sensor; a temperature sensor at an input of the pair of compressors; and an engine control unit, the method comprising, obtaining a functional relationship relating (1) temperature ratio across the pair of compressors as a function of mass flow through said pair of compressors; and (2) pressure drop across the pair of the compressors;

calculating the pressure ratio equal to the pressure at the-input of the pair of compressors to the pressure at the output of the pair of compressors;

using the functional relationship and an output of a mass flow measured by the flow sensor and the calculated pressure ratio to determine the temperature ratio across the pair of the compressors; and estimating the output temperature of the pair of the compressors by using the control unit to multiply the determined temperature ratio across the pair of the compressors by a temperature measured by the temperature sensor.

2. The method recited in claim 1 wherein the functional relationship is a map.

3. A method of estimating output temperature of a pair of serially coupled compressors of a two-stage turbocharger system,-said two-stage turbocharger system including: a mass flow sensor measuring mass flow through the pair of compressors; a pressure sensor for measuring pressure drop across the pair of the compressors; and an engine control unit, the method comprising:

obtaining a first functional relationship relating (1) temperature ratio across a first one of the pair of the serially coupled compressors of the two-stage turbocharger as a function of mass flow through said first one of the compressors; and (2) pressure drop across the first one of the compressors;

obtaining a second functional relationship relating (1) temperature ratio across a second one of the pair of the serially coupled compressors as a function of mass flow through said second one of the compressors; and (2) pressure drop across the second one of the compressors; and combining the first functional relationship and the second functional relationship into a composite functional relationship, said composite functional relationship relating temperature ratio across the pair of the serially coupled compressors of the two-stage turbocharger as a function of mass flow through said pair of the serially coupled compressors and pressure drop across the pair of the serially coupled compressors; and using the engine control unit, the combined functional relationship, mass flow through said pair of the compressors measured by the mass flow sensor, and pressure drop across the pair of the compressors measured by the pressure sensor to estimate the output temperature of the pair of the serially coupled compressors.

4. The method recited in claim 3 wherein each one of the functional relationships is a map.

5. A method of estimating output temperature of an output compressor of a two-stage turbocharger system having an input compressor and the output compressor, the input compressor being serially coupled to the output compressor, said two-stage turbocharger system including: an engine control unit; a mass flow sensor for measuring mass flow through said pair of compressors; and, a pressure sensor for measuring pressure drop across the pair of the compressors, comprising:

determining a first functional relationship for (a) temperature ratio across the input compressor based on mass flow through said input compressor; and (b) pressure drop across the input compressor;

determining a second functional relationship for (a) temperature ratio across the output compressor based on mass flow through said output compressor; and (b) pressure drop across the output compressor; and developing a composite functional relationship, said composite functional relationship relating temperature ratio across the pair of the serially coupled compressors based on mass flow through said pair of the compressors and pressure drop across the pair of the compressors; and using the engine control unit to calculate the estimated output temperature using the combined functional relationship, the mass flow measured by the mass flow sensor and the pressure drop measured by the pressure sensors.

6. The method recited in claim 5 wherein the system includes a temperature sensor at the input of the input compressor, the method further comprising:

using the combined functional relationship and an output of a mass flow at the input to the input compressor and the calculated pressure ratio to determine the temperature ratio across the pair of compressors; and using the engine control unit to calculate the estimated output temperature of the output compressor by multiplying the determined temperature ratio across the pair of compressors by a temperature at the input of the input compressor measured by the temperature sensor.

7. A method of estimating output temperature of an output compressor of a two-stage turbocharger system having an input compressor and the output compressor, the input compressor being serially coupled to the output compressor, said two-stage turbocharger system including: an engine control unit; a mass flow sensor for measuring mass flow through said pair of compressors; and, a pressure sensor for measuring pressure drop across the pair of the compressors, comprising:

obtaining a first functional relationship relating temperature ratio, $\Pi_{T\_Low\_Stage}$, across the input compressor as a function of mass flow through said input compressor and pressure drop $\Pi_{P\_Low\_Stage}$ across the input compressor;

obtaining a second functional relationship relating temperature ratio, $\Pi_{T\_High\_Stage}$, across the output compressor as a function of mass flow through said output compressor and pressure drop, $\Pi_{P\_High\_Stage}$, across the output compressor; and combining the first functional relationship and the second functional relationship into a composite functional relationship, said composite functional relationship relating temperature ratio, $\Pi_{T\_TWO}=\Pi_{T\_Low\_Stage}\times\Pi_{T\_High\_Stage}$, across the pair of as a function of mass flow through said pair of compressors and pressure drop, $\Pi_{P\_TWO}=\Pi_{P\_Low\_Stage}\times\Pi_{P\_High\_Stage}$, across the pair of the compressors, and using the engine control unit to calculate the estimated output temperature using measured mass flow through said pair of compressors; and measured pressure drop across the pair of the compressors, and the combined functional relationship, the mass flow sensor and the pressure sensor.

8. The method recited in claim 7 wherein the system includes a temperature sensor at the input of the input compressor, said method including:

using the combined functional relationship and an output of a mass flow at the input to the input compressor and the calculated pressure ratio to determine the temperature ratio across the pair of compressors; and using the engine control unit to calculate the estimated output temperature of the output compressor by multiplying the temperature ratio across the pair of the compressors by a temperature measured by the temperature sensor.

9. An internal combustion engine system, comprising:

a two-stage turbocharger having a pair of serially coupled compresors;

a temperature sensor disposed at an input of a first one of the pair of compressors;

an engine control unit having:
a memory storing a functional relationship said functional relationship relating temperature ratio across the pair of compressors of the two-stage turbocharger as a function of mass flow through said pair of the compressors and pressure drop across the pair of the compressors; and a processor calculating the pressure ratio equal to the pressure at the input to the first one of the pair of the compressors to the pressure at the output of the second one of the pair of the compressors using the functional relationship and an output of a mass flow at the input to the first one of the pair of the compressors and the calculated pressure ratio to determine the temperature ratio across the pair of the compressors and calculating the estimated output temperature of the second one of the pair of the compressors by multiplying the determined temperature ratio across the pair of the compressors by a temperature sensed by the temperature sensor at the input of the first one of the pair of compressors.

10. The system recited in claim 9 wherein the functional relationship is a map.

11. The system recited in claim 9 wherein the functional relationship is based on a polynomial equation, neural network, fuzzy logic or Chebyshev function approximation.

12. The system recited in claim 9 wherein a low pressure one of the compressors is modeled from measured ambient temperature and temperature losses over an intake system.

13. The system recited in claim 9 wherein pressure downstream a high pressure one of the compressors is modeled from boost pressure and pressure losses over a charge air cooler and pipes connected thereto.

14. The system recited in claim 9 wherein pressure upstream a low pressure one of the compressors is modeled from measured ambient pressure and modeled pressure losses over an intake system.

* * * * *